United States Patent
Lin

(10) Patent No.: US 8,889,005 B2
(45) Date of Patent: Nov. 18, 2014

(54) WATER FILTERING DEVICE

(75) Inventor: Bill Lin, New Taipei (TW)

(73) Assignee: Push Enterprise Co., Ltd, New Taipei (TW)

( * ) Notice: Subject to any disclaimer, the term of this patent is extended or adjusted under 35 U.S.C. 154(b) by 376 days.

(21) Appl. No.: 13/484,778

(22) Filed: May 31, 2012

(65) Prior Publication Data

US 2013/0319927 A1    Dec. 5, 2013

(51) Int. Cl.
*C02F 1/00* (2006.01)
*B01D 24/10* (2006.01)
*B01D 29/25* (2006.01)
*C02F 9/02* (2006.01)
*B01D 24/38* (2006.01)
*B01D 29/27* (2006.01)

(52) U.S. Cl.
CPC ............... *B01D 23/04* (2013.01); *B01D 29/25* (2013.01)
USPC ........ 210/335; 210/172.1; 210/248; 210/255; 210/260; 210/262; 210/314; 210/342; 210/448; 210/455; 210/464; 210/467; 210/469

(58) Field of Classification Search
None
See application file for complete search history.

(56) References Cited

U.S. PATENT DOCUMENTS

| | | | | |
|---|---|---|---|---|
| 667,239 | A | * | 2/1901 | Marx et al. ..................... 210/335 |
| 2,711,994 | A | * | 6/1955 | Quinn ........................... 210/205 |
| 3,744,639 | A | * | 7/1973 | Teeple et al. .................. 210/265 |
| 4,776,963 | A | * | 10/1988 | Inagaki et al. ................. 210/764 |
| 4,879,030 | A | * | 11/1989 | Stache .......................... 210/238 |
| 4,983,286 | A | * | 1/1991 | Inagaki et al. ............. 210/257.1 |
| 2011/0284442 | A1 | * | 11/2011 | Williams ................. 210/170.09 |

* cited by examiner

*Primary Examiner* — Benjamin Kurtz
(74) *Attorney, Agent, or Firm* — C. G. Mersereau; Nikolai & Mersereau, P.A.

(57) ABSTRACT

A water filtering device includes a filter bag and an outer bag. The filter bag is internally provided with a first and a second filter unit. The first filter unit is connected at upper ends to a top opening of the filter bag to form a lower folded section and define a first water filtering space in the filter bag. The second filter unit is fixedly connected to a water outlet on a bottom of the filter bag and defines a second water filtering space in the filter bag. A filter material is provided in the second water filtering space. The outer bag covers the filter bag, such that a water storing space is formed between the outer bag and the filter bag. The water filtering device is conveniently portable and saves any assembling procedure, and can effectively filter water and store the filtered water.

13 Claims, 13 Drawing Sheets

WATER FILTERING DEVICE

FIELD OF THE INVENTION

The present invention relates to a water filtering device, and more particularly to a water filtering device that is conveniently portable and saves assembling procedures, and can effectively filter water and store the filtered water.

BACKGROUND OF THE INVENTION

Due to the progress and development in different industrial fields, the high productivity brought by the mechanized and automated production, as well as various highly matured technological skills, many daily necessaries are now mainly produced with low-cost chemical compounds and plastic materials to enable high output and low price thereof. However, the use of a large quantity of products made of chemical compounds and plastic materials inevitably results in many environmental problems, such as air pollution and water contamination.

Meanwhile, following the constantly upgraded living standards, people pay more attention to the quality of their drinking water. There are now various kinds of water filters developed and introduced into the market. All these water filters internally include a filter cartridge received in a filter cylinder. The water filter removes impurities from water, so that a user can obtain clean drinking water. However, most of the commercially available filter cylinders involve complicated procedures to disassemble and re-assemble them, and the filter cartridges in the filter cylinder could not be easily replaced by general users.

There are also different kinds of water filter jugs available in the market. A general water filter jug includes a container internally provided with a filter cartridge or a filter cylinder for holding water to be filtered. When the unfiltered water poured into the container seeps through the filter cartridge or the filter cylinder due to gravity, impurities and bacteria are filtered from the water. Most water filter jugs are not designed for personal use; they have a large volume and could not be easily carried about for use outdoors in a convenient manner.

Since the currently available water filter jugs could not be conveniently carried about for use in ocean activities or mountain activities in isolated areas, it is uneasy to get clean drinking water at any time in case of an emergency during an ocean or mountain activity, and it is dangerous to directly drink surface water or seawater. Particularly, in view of many natural calamities possibly caused by the increasingly serious problem of global warming in recent years, it becomes very important for people to have means usable in all kinds of emergencies or disasters to quickly and conveniently get drinkable water to survive in the disaster and wait for rescue. In brief, an uninterrupted source of drinkable water forms the most important factor to survive in an emergency or disaster.

Therefore, portable water filtering devices have been researched and developed. Please refer to FIGS. 1A, 1B and 1C. A conventional water filtering device 1 mainly includes an outer bag 11 and an inner filter bag 12. The outer bag 11 internally defines a receiving space 111 and has two conduits 112 spaced on a bottom thereof. A top of the outer bag 11 forms a zip-lock opening 113. The conduits 112 can be connected to the outer bag 11 in a watertight manner by means of ultrasonic welding or gluing. The filter bag 12 is mainly used to separate ions from water. It internally defines a filtering space 121 and has a top forming a zip-lock opening 122. To use the water filtering device 1, first put the filter bag 12 in the receiving space 111 of the outer bag 11 with a bottom of the filter bag 12 abutted against the conduits 112, and then pour unfiltered water into the filtering space 121 of the filter bag 12. The outer bag 11 and the filter bag 12 received therein are then sealed at their zip-lock openings and squeezed, as shown in FIG. 3C, so that the unfiltered water in the filter bag 12 seeps through the filter bag 12 into a space between the outer bag 11 and the filter bag 12 to flow out of the outer bag 11 via the conduits 112. The water is filtered when it seeps through the filter bag 12.

The outer bag 11 and the filter bag 12 for the conventional water filtering device 1 are separated from each other before they are used outdoors. It is inconvenient for a user to carry two separate bags 11, 12 and to further assemble the two bags 11, 12 together for use. It is also troublesome to squeeze the assembled outer bag 11 and filter bag 12 to achieve the purpose of filtering water. Further, the conventional water filtering device 1 can only filter water one time via the filter bag 12 and fails to effectively filter impurities and bacteria from water. The water filtering device 1 does not include any structure for effectively storing the filtered water; and the zip-lock openings 113, 122 of the outer bag 11 and the filter bag 12, respectively, could not be securely sealed and tend to be opened under squeezing. As a result, unfiltered water in the filter bag 12 tends to overflow the zip-lock opening 122 to contaminate the filtered water in the receiving space 111 of the outer bag 11.

In conclusion, the above-structured conventional water filtering device 1 has the following disadvantages: (1) it is not conveniently portable and requires further assembling procedures; (2) it must be squeezed to achieve the purpose of filtering water, and the single-layer filter bag fails to simultaneously filter impurities and bacteria from water; (3) it can not effectively store the filtered water; and (5) the filtered water is easily contaminated by the unfiltered water overflowed the zip-lock opening of the filter bag.

It is therefore tried by the inventor to develop an improved water filtering device to eliminate the disadvantages in the conventional water filtering device.

SUMMARY OF THE INVENTION

A primary object of the present invention is to effectively overcome the above problems by providing a water filtering device that is conveniently portable and saves any assembling procedure, includes multiple filtering layers, and has a water storing space for the filtered water.

Another object of the present invention is to provide a water filtering device that utilizes natural force of gravity to filter water.

A further object of the present invention is to provide a water filtering device that is able to prevent filtered water therein from being contaminated again.

To achieve the above and other objects, the water filtering device according to an embodiment of the present invention includes a filter bag having a top forming a filter bag opening and a bottom provided with a filter bag water outlet. The filter bag is internally provided with a first filter unit and a second filter unit. The first filter unit is connected at upper ends to the filter bag opening to thereby form a lower folded section and define a first water filtering space in the filter bag above the lower folded section, and the second filter unit is fixedly connected to a position of the filter bag above the filter bag water outlet, so that a second water filtering space is formed in the filter bag between the second filter unit and the first filter unit. And, the second water filtering space has a filter material provided therein. With the above arrangements, the water filtering device is conveniently portable and saves any assembling procedure. Further, with the first filter unit and the filter material, the water filtering device can provide the multi-filtering effect.

To achieve the above and other objects, the water filtering device according to another embodiment of the present invention includes a filter bag and an outer bag. The filter bag has a top forming a filter bag opening and a bottom provided with a filter bag water outlet, and is internally provided with a first filter unit and a second filter unit. The first filter unit is connected at upper ends to the filter bag opening to thereby form a lower folded section and define a first water filtering space in the filter bag above the lower folded section, and the second filter unit is fixedly connected to the filter bag water outlet, so that a second water filtering space is formed in the filter bag between the second filter unit and the first filter unit. And, the second water filtering space has a filter material provided therein. The outer bag covers the filter bag in such a way that a water storing space is formed between the outer bag and the filter bag. The outer bag has a top forming an outer bag opening and a bottom provided with an outer bag water outlet. The outer bag opening is connected to the filter bag opening and the first filter unit, and the outer bag water outlet communicates with the water storing space and the filter bag water outlet. With the above arrangements, the water filtering device is conveniently portable and saves any assembling procedure. Further, with the first filter unit and the filter material, the water filtering device can provide the multi-filtering effect; and with the water storing space, the water filtering device can provide the effect of storing filtered water.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
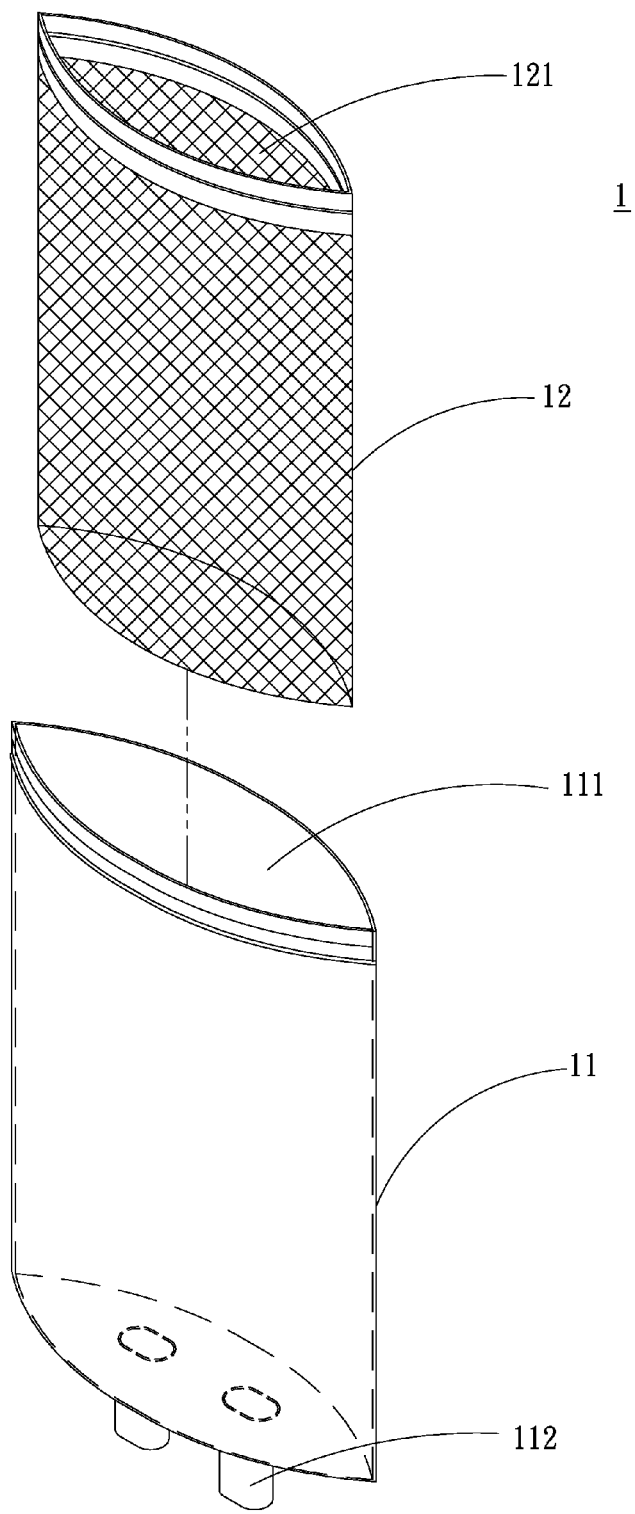
FIG. 1A is an exploded perspective view of a conventional water filtering device.
Figure 1B:
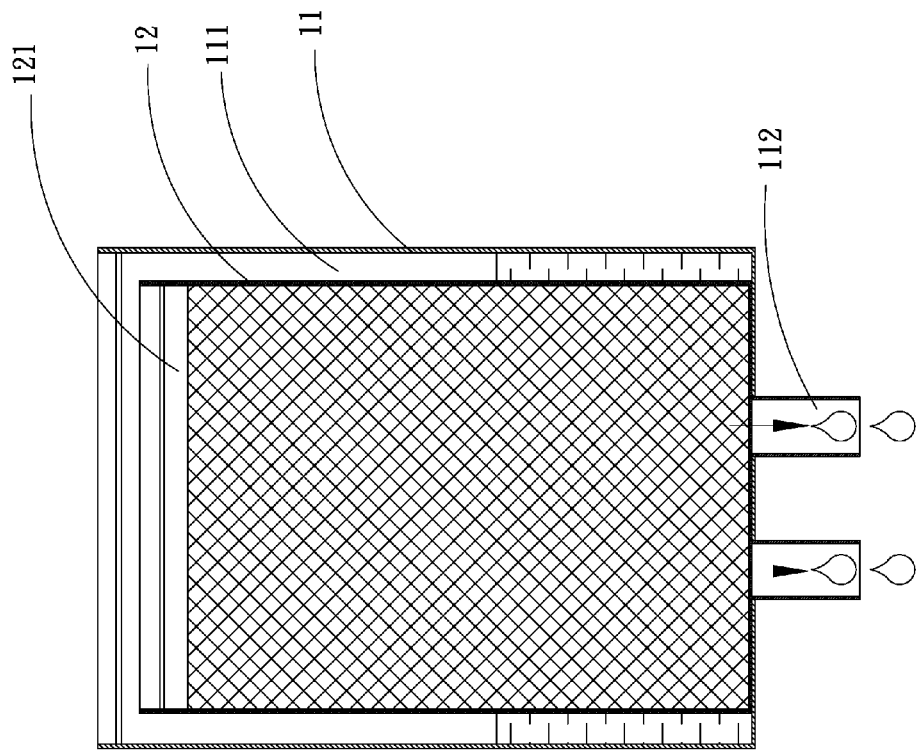
FIG. 1B is an assembled plan view of the conventional water filtering device of FIG. 1A.
Figure 1C:
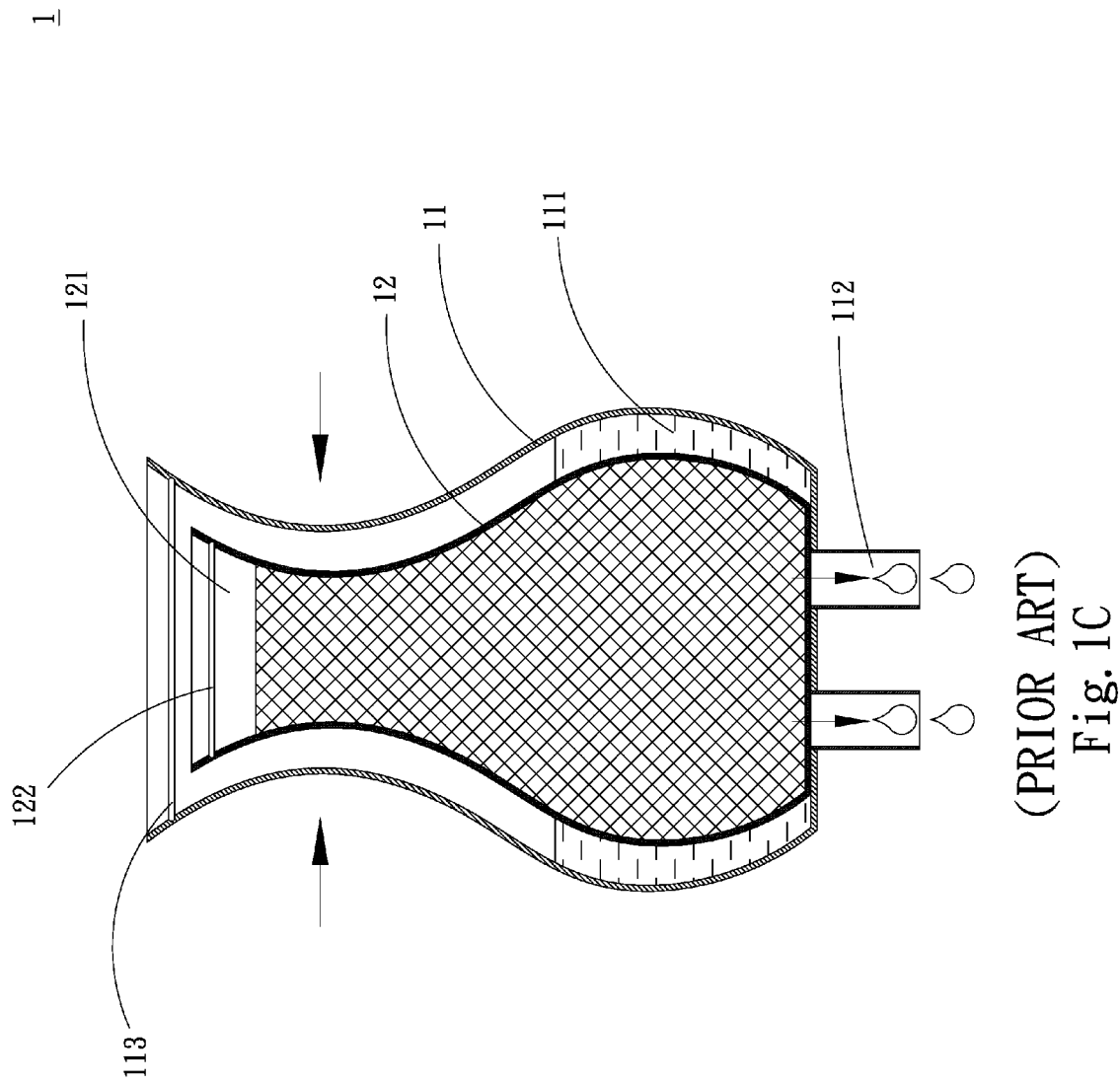
FIG. 1C shows the manner of using the conventional water filtering device of FIG. 1B.

The present invention will now be described with some preferred embodiments thereof and with reference to the accompanying drawings. For the purpose of easy to understand, elements that are the same in the preferred embodiments are denoted by the same reference numerals.

Figure 2A:
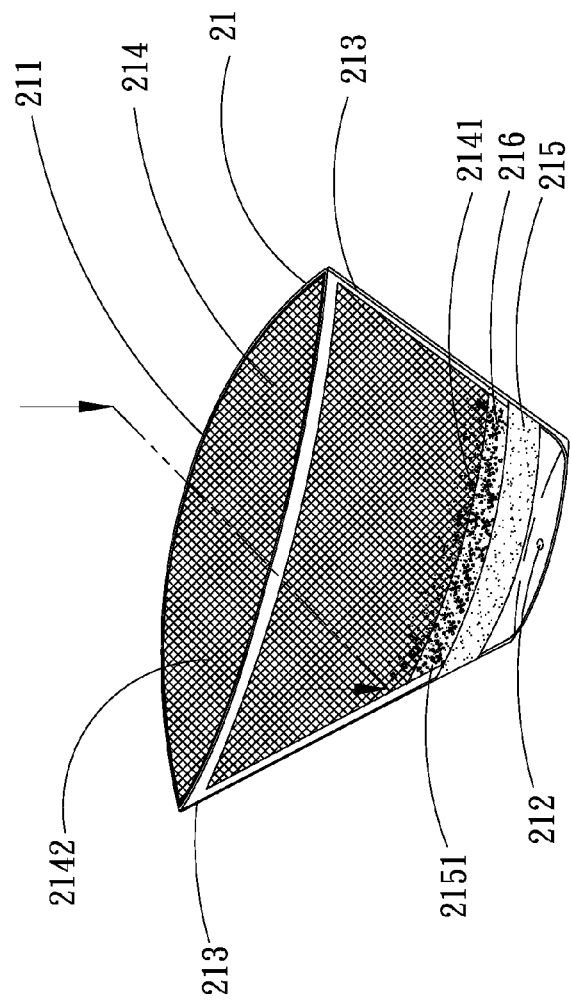
FIG. 2A is a perspective view of a water filtering device according to a first preferred embodiment of the present invention.
Figure 2B:
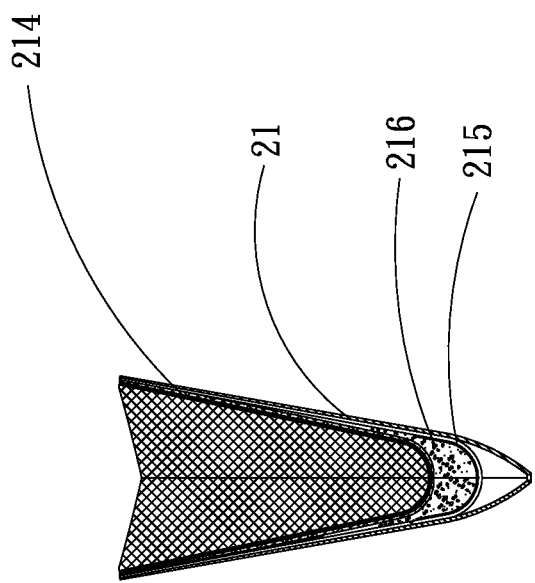
FIG. 2B is a sectional side view of the water filtering device of FIG. 2A.

Please refer to FIGS. 2A and 2B that are perspective and sectional side views, respectively, of a water filtering device 2 according to a first preferred embodiment of the present invention. As shown, in the first preferred embodiment, the water filtering device 2 includes a filter bag 21, which has a top forming a filter bag opening 211, a bottom provided with a filter bag water outlet 212, and two sealed filter bag lateral edges 213. The filter bag 21 is internally provided with a first filter unit 214 and a second filter unit 215. In the first preferred embodiment, the first filter unit 214 is implemented as having multiple filtering layers made of a material capable of filtering coliform bacilli and the like from unfiltered water. The first filter unit 214 is fixedly held in the filter bag 21 by connecting its two upper ends to two opposite sides of the filter bag opening 211 to thereby form a lower folded section 2141 and by connecting its two lateral sides to the two sealed filter bag lateral edges 213 of the filter bag 21, such that a first water filtering space 2142 is defined by the first filter unit 214 between the lower folded section 2141 and the filter bag opening 211. The first filter unit 214 can be fixedly connected to and held in the filter bag 21 by way of heat sealing, so that the two upper ends of the first filter unit 214 are integrally connected to the filter bag opening 211 and the two lateral sides of the first filter unit 214 are integrally connected to the two sealed filter bag lateral edges 213.

In the first preferred embodiment, the second filter unit 215 is implemented as having one single filtering layer made of a material capable of filtering coliform bacilli and the like from unfiltered water. With the second filter unit 215, a second time filtration of bacteria from water can be achieved. However, the second filter unit 215 may also be made of a material simply allowing water to seep therethrough.

The second filter unit 215 is fixedly held in the filter bag 21 by connecting its two lateral sides to the two sealed filter bag lateral edges 213 of the filter bag 21 and by attaching its outer surfaces to inner surfaces of the filter bag 21. The second filter unit 215 can be fixedly connected to and held in the filter bag 21 by way of heat sealing, so that the second filter unit 215 is integrally connected to the inner surfaces of the filter bag 21 with the two lateral sides integrally connected to the two sealed filter bag lateral edges 213. Meanwhile, the second filter unit 215 is fixedly located above the filter bag water outlet 212 to close the same, and a second water filtering space 2151 is formed in the filter bag 21 between the second filter unit 215 and the first filter unit 214. A filter material 216 is provided in the second water filtering space 2151 and is restricted thereto by the first and the second filter unit 214, 215. The filter material 216 can be, but not limited to, a photocatalyst, activated carbon, Porphyritic Andesite, or zeolite, which is capable of softening and disinfecting water, improving water quality, adjusting the pH value of water, or filtering hazardous metal substances from unfiltered water, such as aluminum, mercury and the like.

With the above structure, the water filtering device 2 according to the present invention is conveniently portable for use in office, home, outdoor ocean activities and mountain activities at isolated areas, or even in an emergency. To use the water filtering device 2, first pour unfiltered water into the first water filtering space 2142 of the first filter unit 214 via the filter bag opening 211 of the filter bag 21, and allow the unfiltered water to naturally seep through the first filter unit 214 due to gravity to flow down into the second water filtering space 2151 of the second filter unit 215, at where the preliminarily filtered water is filtered again by the filter material 216 in the second water filtering space 2151 and then flows to the filter bag water outlet 212. Therefore, the water filtering device 2 of the present invention is conveniently portable and saves any assembling procedure. Further, with the first and second filter units 214, 215 as well as the filter material 216, water is filtered more than one time and the filtered water is not subjected to the risk of being contaminated again.

Figure 3:
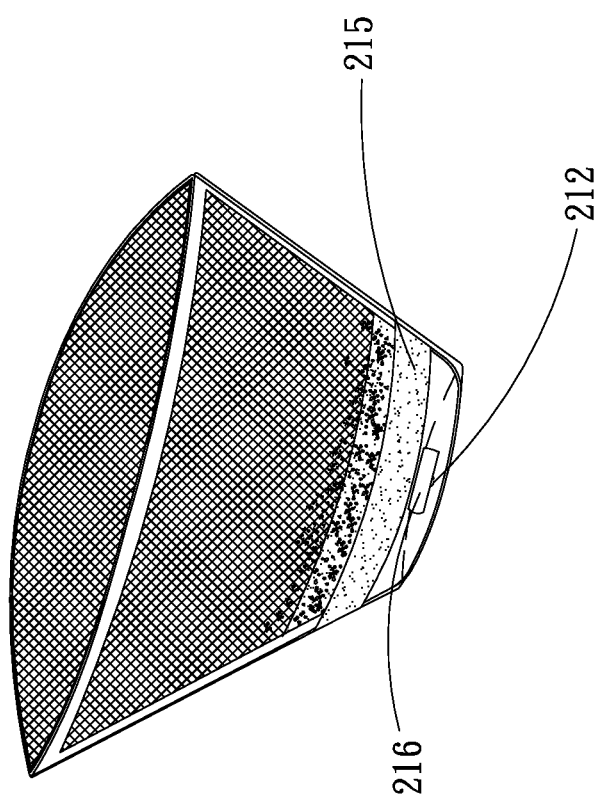
FIG. 3 is a perspective view of a water filtering device according to a second preferred embodiment of the present invention.

FIG. 3 is a perspective view of a water filtering device according to a second preferred embodiment of the present invention. As shown, the second preferred embodiment is generally structurally and operatively similar to the first preferred embodiment, except that, in the second preferred embodiment, additional filter material 216 is provided in the filter bag between the second filter unit 215 and filter bag water outlet 212. Again, the additional filter material 216 can be, but not limited, a photocatalyst, activated carbon, Porphyritic Andesite or zeolite for further filtering hazardous metal substances from water, softening and disinfecting water, improving water quality, and adjusting the pH value of water.

Figure 4A:
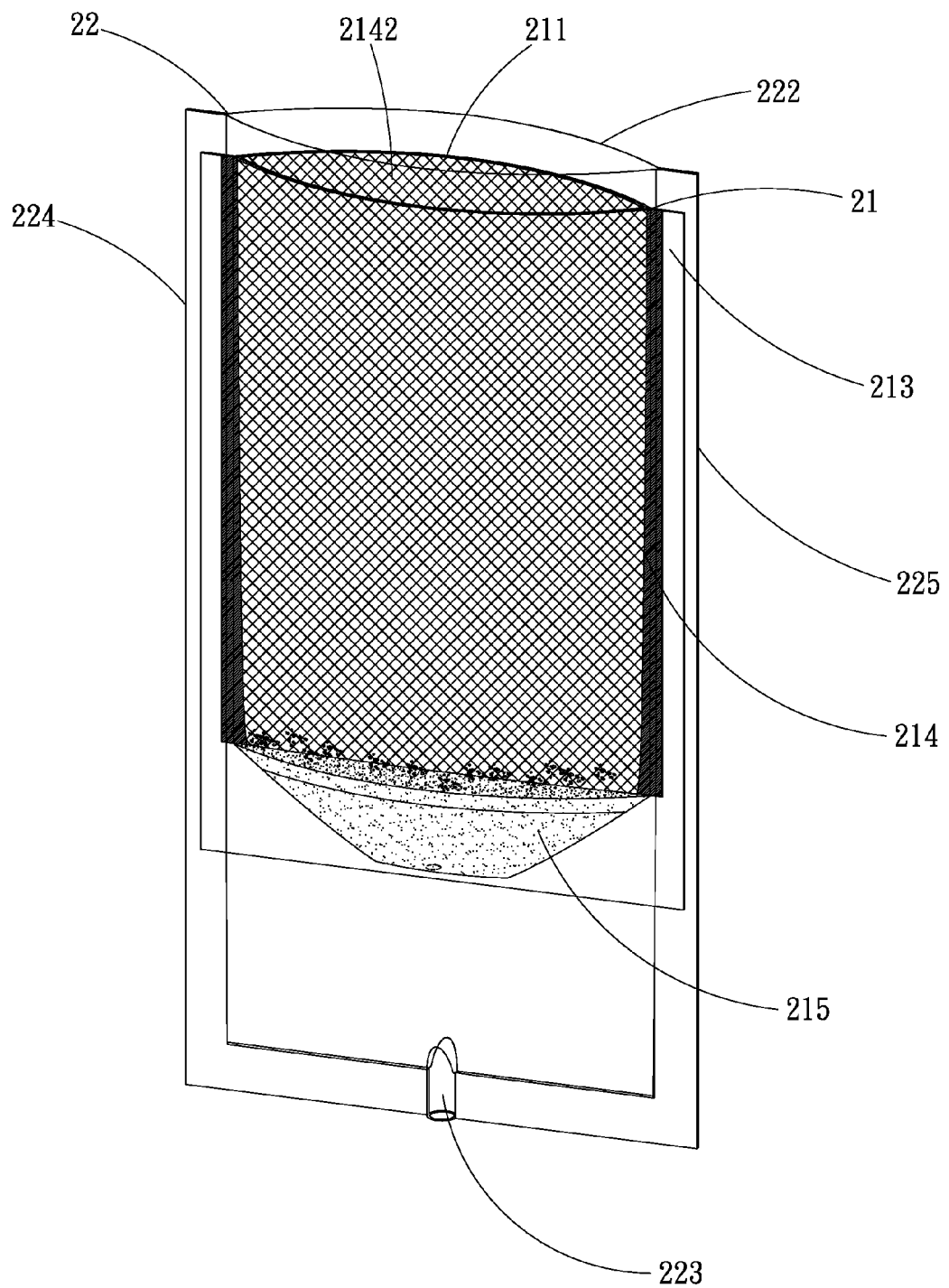
FIG. 4A is an assembled perspective view of a water filtering device according to a third preferred embodiment of the present invention.
Figure 4B:
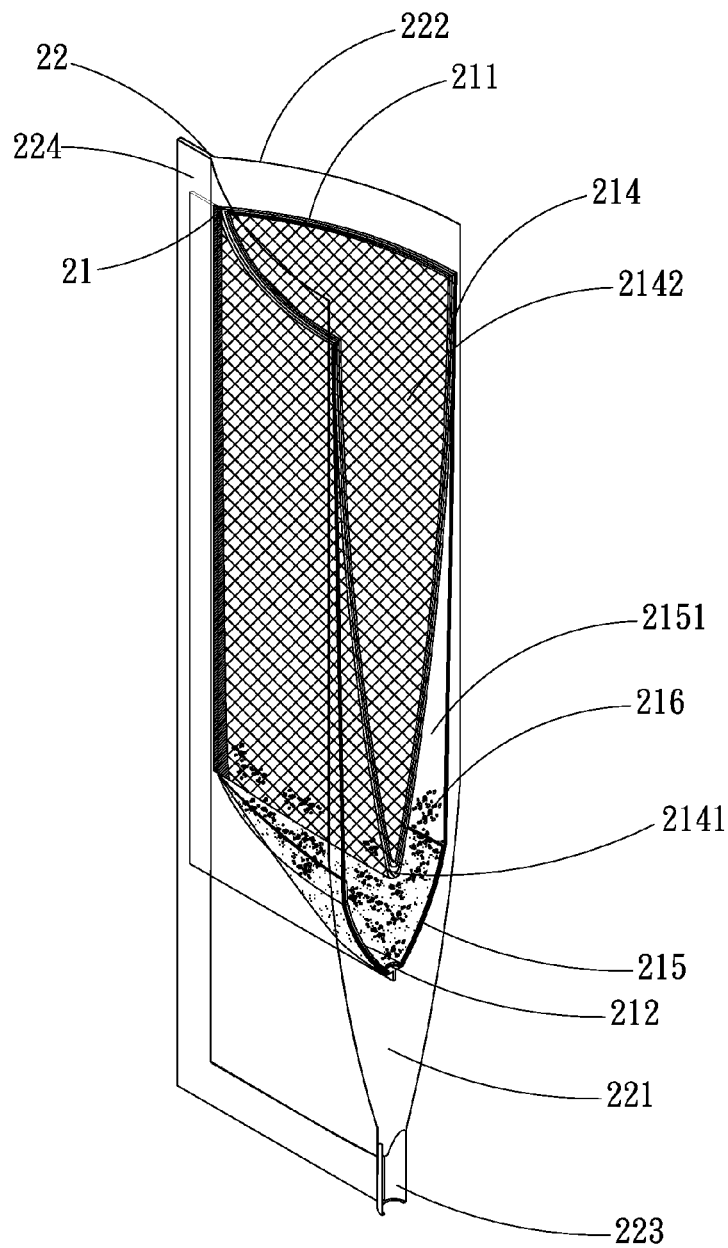
FIG. 4B is a sectional perspective view of the water filtering device of FIG. 4A.
Figure 4C:
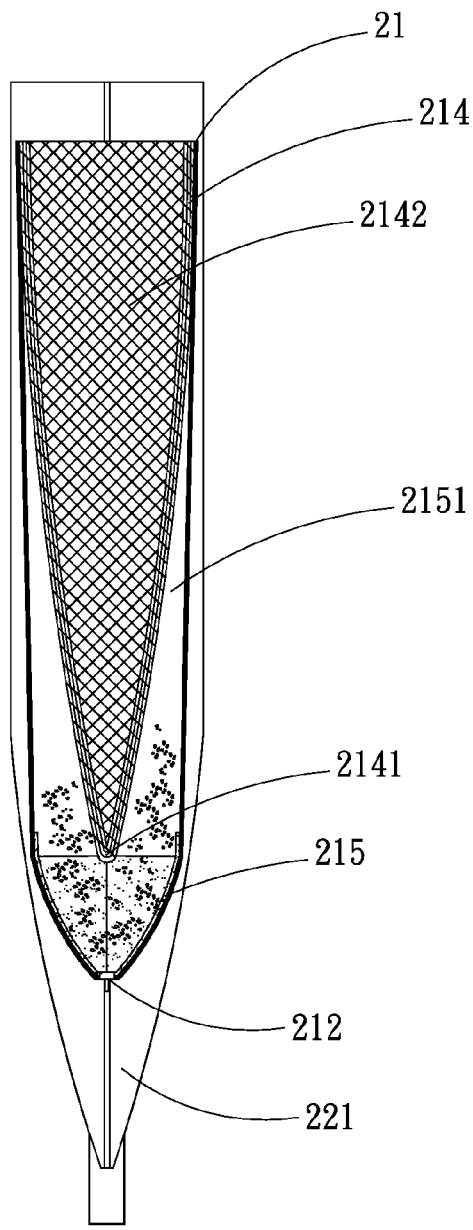
FIG. 4C is a sectional side view of the water filtering device of FIG. 4A.

FIGS. 4A, 4B and 4C are perspective, sectional perspective and sectional side views, respectively, of a water filtering device 2 according to a third preferred embodiment of the present invention. As shown, the water filtering device 2 in the third preferred embodiment includes a filter bag 21 and an outer bag 22. The filter bag 21 has a top forming a filter bag opening 211, a bottom provided with a filter bag water outlet 212, and two sealed filter bag lateral edges 213. The filter bag 21 is internally provided with a first filter unit 214 and a second filter unit 215. In the third preferred embodiment, the first filter unit 214 is implemented as having multiple filtering layers made of a material capable of filtering coliform bacilli and the like from unfiltered water. The first filter unit 214 is fixedly held in the filter bag 21 by connecting its two upper ends to two opposite sides of the filter bag opening 211 to thereby form a lower folded section 2141 and by connecting its two lateral sides to the two sealed filter bag lateral edges 213 of the filter bag 21, such that a first water filtering space 2142 is defined by the first filter unit 214 between the lower folded section 2141 and the filter bag opening 211. The first filter unit 214 can be fixedly connected to and held in the filter bag 21 by way of heat sealing, so that the two upper ends of the first filter unit 214 are integrally connected to the filter bag opening 211 and the two lateral sides of the first filter unit 214 are integrally connected to the two sealed filter bag lateral edges 213.

In the third preferred embodiment, the second filter unit 215 is implemented as having one single filtering layer made of a material capable of filtering coliform bacilli and the like from unfiltered water. With the second filter unit 215, a second time filtration of bacteria from water can be achieved. However, the second filter unit 215 may also be made of a material simply allowing water to seep therethrough.

The second filter unit 215 is fixedly held in the filter bag 21 by connecting its two lateral sides to the two sealed filter bag lateral edges 213 of the filter bag 21 and by attaching its outer surfaces to inner surfaces of the filter bag 21. The second filter unit 215 can be fixedly connected to and held in the filter bag 21 by way of heat sealing, so that the second filter unit 215 is integrally connected to the inner surfaces of the filter bag 21 with the two lateral sides integrally connected to the two sealed filter bag lateral edges 213. Meanwhile, the second filter unit 215 is fixedly connected to the filter bag water outlet 212 to close the same, and a second water filtering space 2151 is formed in the filter bag 21 between the second filter unit 215 and the first filter unit 214. A filter material 216 is provided in the second water filtering space 2151 and is restricted thereto by the first and the second filter unit 214, 215. The filter material 216 can be, but not limited to, a photocatalyst, activated carbon, Porphyritic Andesite, or zeolite, which is capable of softening and disinfecting water, improving water quality, adjusting the pH value of water, or filtering hazardous metal substances from unfiltered water, such as aluminum, mercury and the like.

The outer bag 22 covers the filter bag 21 in such a way that a water storing space 221 is formed between the outer bag 22 and the filter bag 21. The outer bag 22 has a top forming an outer bag opening 222, a bottom provided with an outer bag water outlet 223, and two sealed lateral edges, namely, a first sealed lateral edge 224 and a second lateral edge 225. The outer bag opening 222 is connected to the filter bag opening 211 and the first filter unit 214, and the outer bag water outlet 223 communicates with the water storing space 221 and the filter bag water outlet 212. The two sealed filter bag lateral edges 213 are integrally connected to the first and the second sealed lateral edge 224, 225. Meanwhile, the first filter unit 214 and the second filter unit 215 are also integrally connected at their two lateral sides to the first and the second sealed lateral edge 224, 225. With the above structure, the water filtering device 2 according to the third preferred embodiment of the present invention is conveniently portable for use in office, home, outdoor ocean activities and mountain activities in isolated areas, or even in an emergency. To use the water filtering device 2, first pour unfiltered water into the first water filtering space 2142 of the first filter unit 214 via the filter bag opening 211 of the filter bag 21, and allow the unfiltered water to naturally seep through the first filter unit 214 due to gravity to flow down into the second water filtering space 2151 of the second filter unit 215, at where the preliminarily filtered water is filtered again by the filter material 216 in the second water filtering space 2151 and then flows to the filter bag water outlet 212. Therefore, the water filtering device 2 of the present invention is conveniently portable and saves any assembling procedure. Further, with the first and second filter units 214, 215 as well as the filter material 216, water is filtered more than one time and the filtered water is not subjected to the risk of being contaminated again.

Figure 5A:
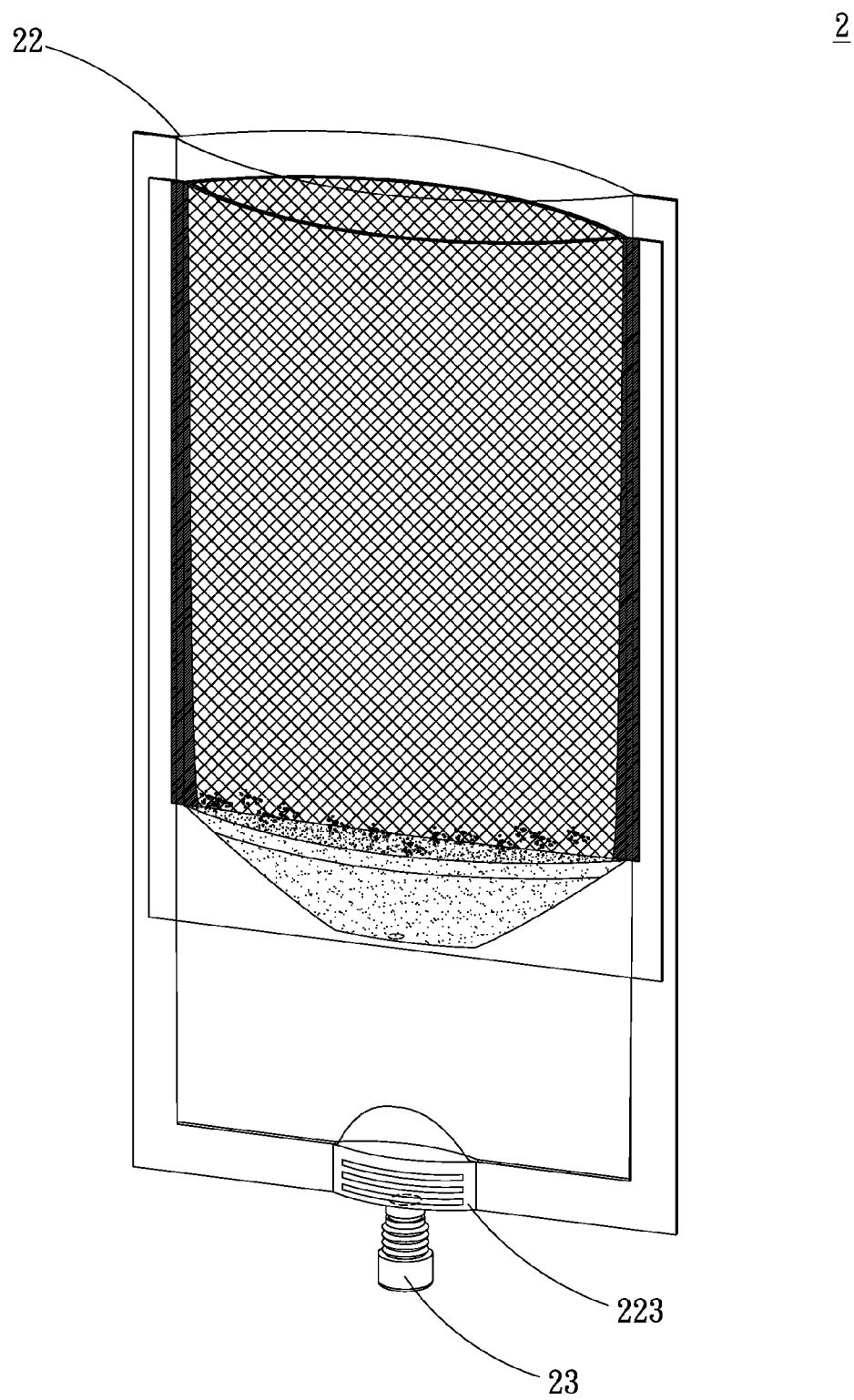
FIG. 5A is an assembled perspective view of a water filtering device according to a fourth preferred embodiment of the present invention.
Figure 5B:
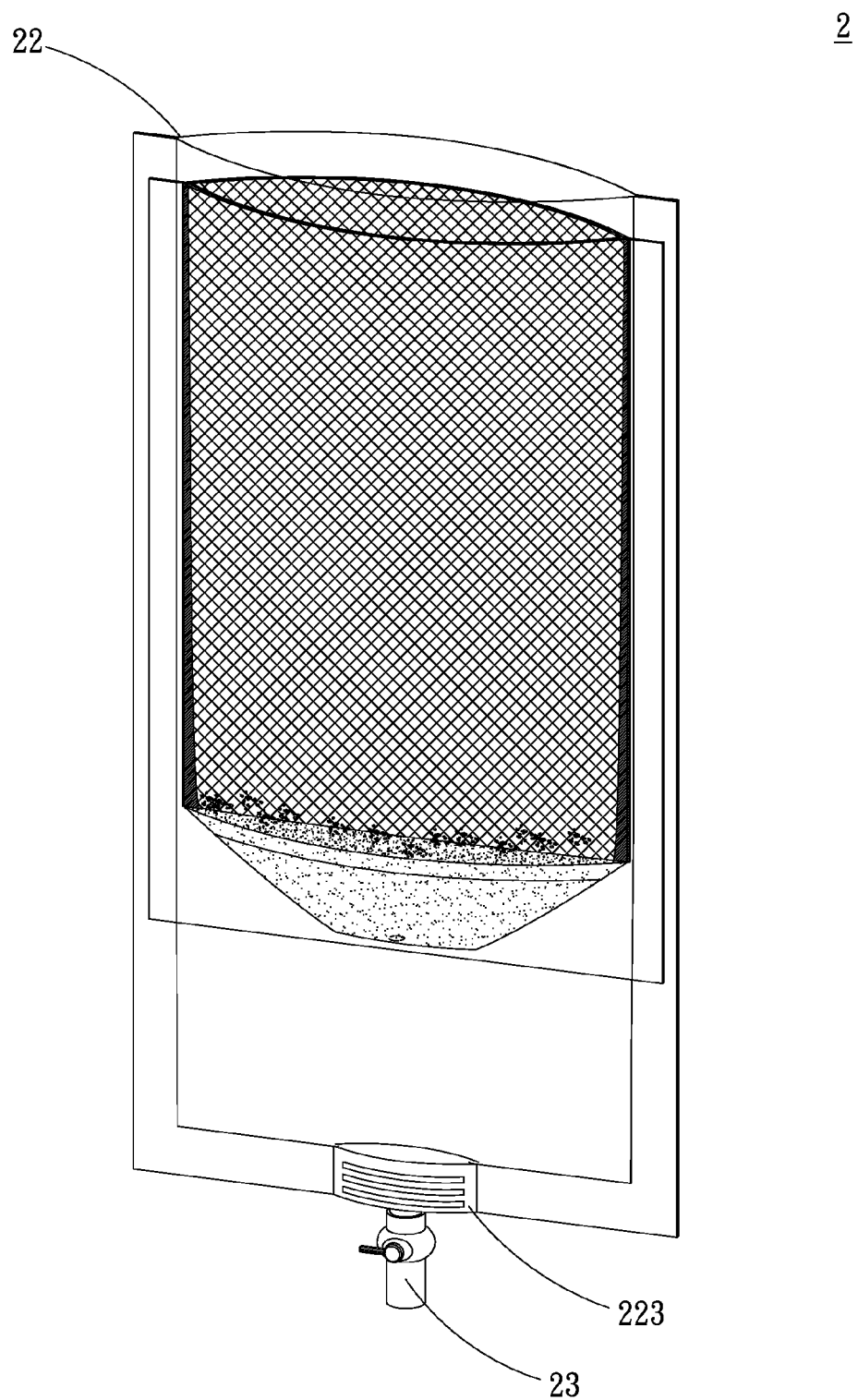
FIG. 5B shows the water filtering device of FIG. 5A with a different tap.
Figure 5C:
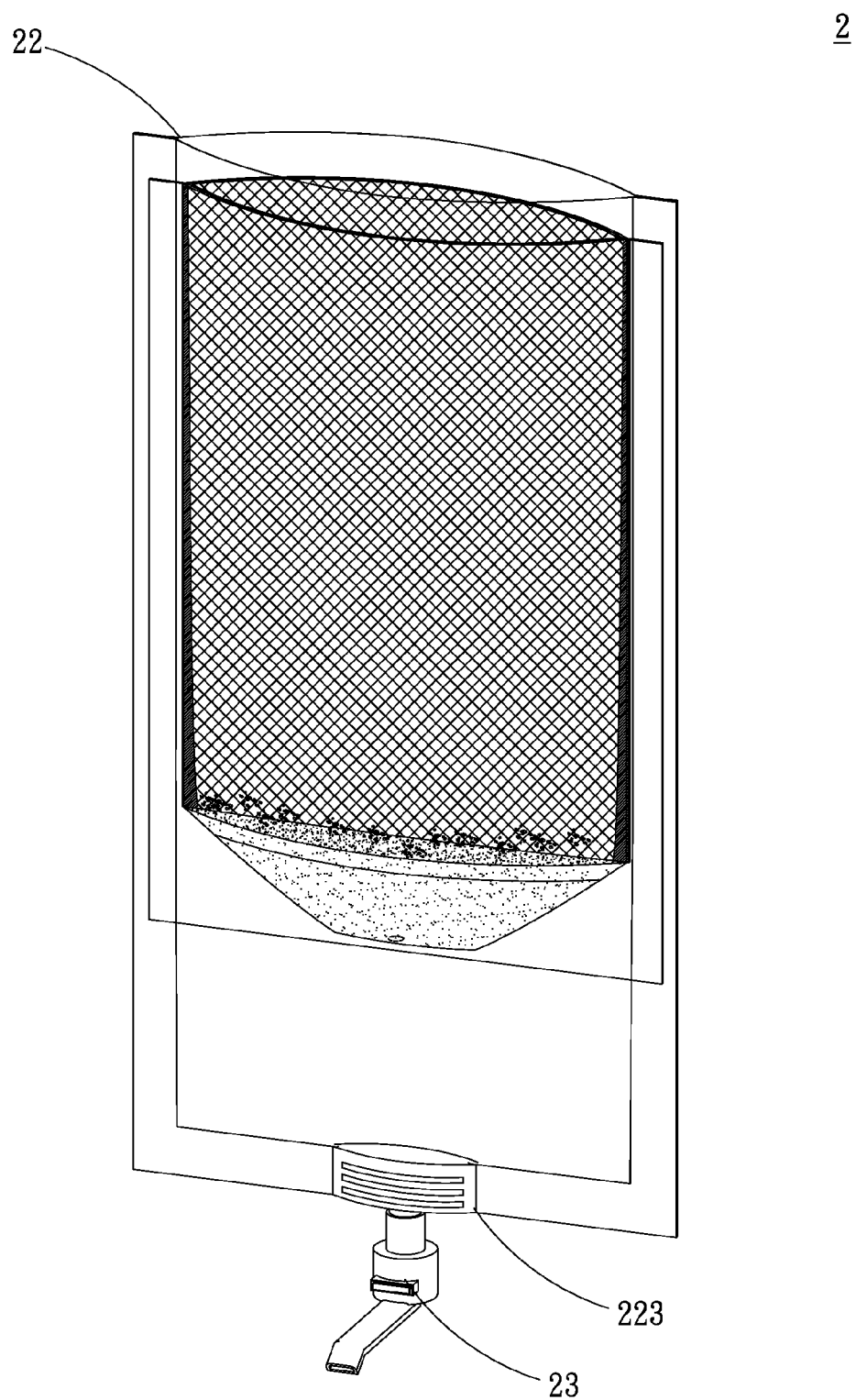
FIG. 5C shows the water filtering device of FIG. 5A with another different tap.

Please refer to FIGS. 5A, 5B and 5C that are perspective views respectively showing a water filtering device 2 according to a fourth preferred embodiment of the present invention. As shown, the water filtering device 2 in the fourth preferred embodiment is generally structurally and operatively similar to the third preferred embodiment, except for a tap 23 that is provided on the bottom of the outer bag 22 to connect to the outer bag water outlet 223. As can be seen from FIGS. 5A, 5B and 5C, differently configured taps 23 are available for the water filtering device 2 according to the fourth preferred embodiment of the present invention. Therefore, water having been filtered by the second filter unit 215 and stored in the water storing space 221 can flow out of the outer bag 22 via the outer bag water outlet 223 under control of the tap 23. With these arrangements, the water filtering device 2 can also effectively store the filtered water.

Figure 6:
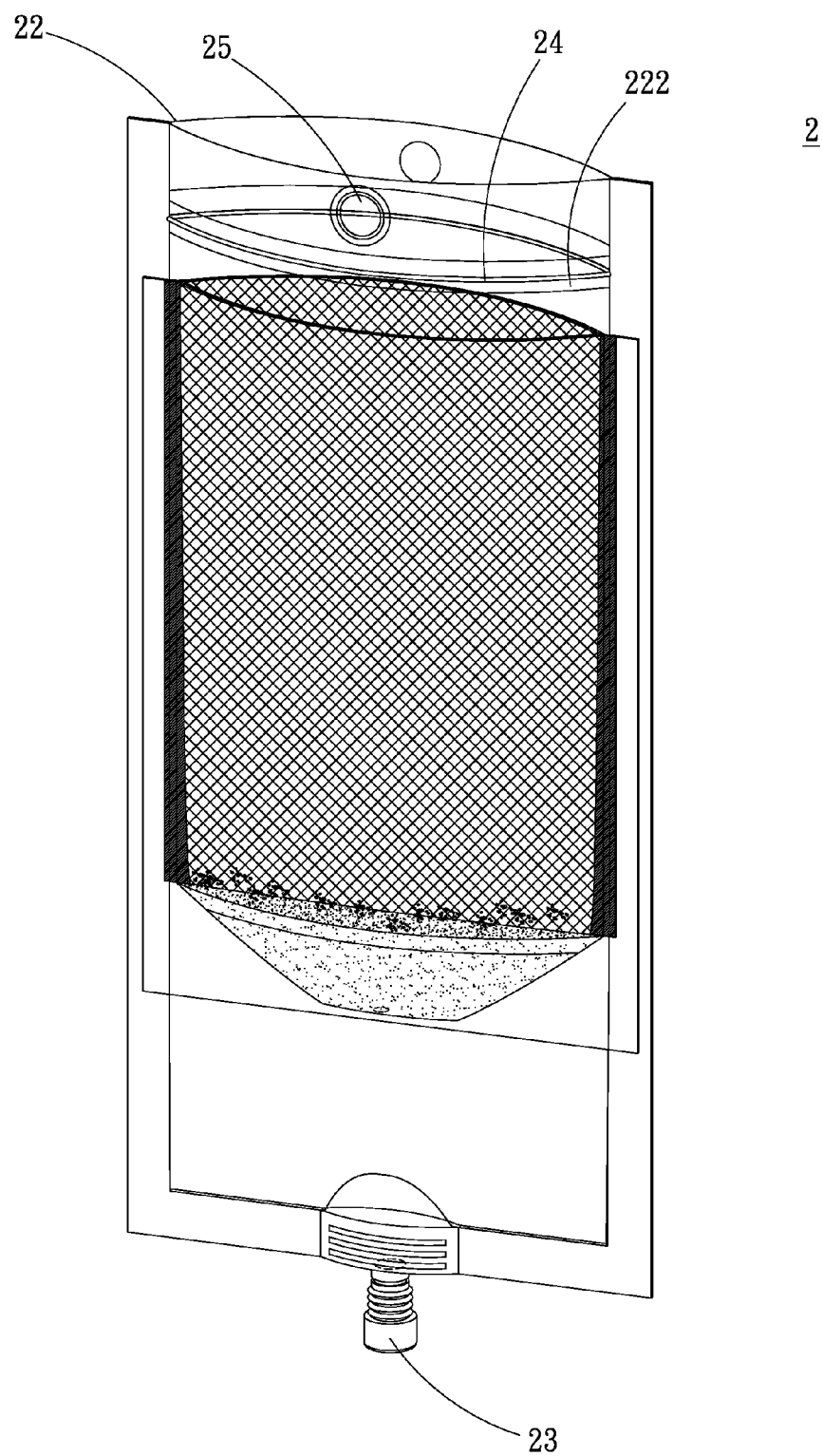
FIG. 6 is a perspective view of a water filtering device according to a fifth embodiment of the present invention.

FIG. 6 is a perspective view of a water filtering device 2 according to a fifth preferred embodiment of the present invention. As shown, the fifth preferred embodiment is generally structurally and operatively similar to the fourth preferred embodiment, except that, in the fifth preferred embodiment, the outer bag opening 222 is forward extended by a length to have a sealing element 24 and a hanging element 25 provided thereat. The sealing member 24 may effectively close the outer bag opening 222. With the sealing member 24 and the tap 23 provided on the outer bag 22, the water filtering device 2 of the present invention can effectively store filtered water. And, with the hanging element 25 provided on the forward extended outer bag opening 222, the water filtering device 2 can be hung on something via the hanging element 25 to facilitate convenient filtration of unfiltered water in the filter bag 21.

In brief, the water filtering device according to the present invention provides the following advantages: (1) it is conveniently portable and saves any assembling procedure; (2) it provides multiple filtering layers and can store filtered water; and (3) it does not require squeezing in the process of filtering water and can avoid the filtered water from being contaminated again.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A water filtering device, comprising a filter bag having a top forming a filter bag opening and a bottom provided with a filter bag water outlet; the filter bag being internally provided with a first filter unit and a second filter unit, the first filter unit being connected at upper ends to the filter bag opening to thereby form a lower folded section and define a first water filtering space in the filter bag above the lower folded section, and the second filter unit being fixedly connected to a position of the filter bag above the filter bag water outlet, so that a second water filtering space is formed in the filter bag between the second filter unit and the first filter unit; and the second water filtering space having a filter material provided therein, wherein the filter bag has two sealed filter bag lateral edges, and the first filtering unit and the second filtering unit both being integrally connected at two lateral sides to the two sealed filter bag lateral edges.

2. The water filtering device as claimed in claim 1, wherein the filter material is also provided in the filter bag between the second filter unit and the filter bag water outlet.

3. The water filtering device as claimed in claim 1, wherein the first filter unit includes multiple filtering layers.

4. A water filtering device, comprising:

a filter bag having a top forming a filter bag opening and a bottom provided with a filter bag water outlet; the filter bag being internally provided with a first filter unit and a second filter unit, the first filter unit being connected at upper ends to the filter bag opening to thereby form a lower folded section and define a first water filtering space in the filter bag above the lower folded section, and the second filter unit being fixedly connected to the filter bag water outlet, so that a second water filtering space is formed in the filter bag between the second filter unit and the first filter unit; and the second water filtering space having a filter material provided therein; and an outer bag covering the filter bag in such a way that a water storing space is formed between the outer bag and the filter bag; the outer bag having a top forming an outer bag opening and a bottom provided with an outer bag water outlet; the outer bag opening being connected to the filter bag opening and the first filter unit, and the outer bag water outlet communicating with the water storing space and the filter bag water outlet.

5. The water filtering device as claimed in claim 4, wherein the outer bag has two lateral edges forming a first sealed lateral edge and a second lateral edge, and the filter bag has two lateral edges forming two sealed filter bag lateral edges; and the filter bag being integrally connected at the two sealed filter bag lateral edges to the first and the second sealed lateral edges.

6. The water filtering device as claimed in claim 4, wherein the outer bag has two lateral edges forming a first sealed lateral edge and a second lateral edge, and the first filtering unit and the second filtering unit both being integrally connected at two lateral sides to the first and the second sealed lateral edges.

7. The water filtering device as claimed in claim 4, wherein the water storing space is provided with the filter material.

8. The water filtering device as claimed in claim 4, wherein the second filter unit closes the filter bag water outlet.

9. The water filtering device as claimed in claim 4, wherein the filter material is selected from the group consisting of a photocatalyst, activated carbon, porphyritic Andesite, and zeolite.

10. The water filtering device as claimed in claim 4, wherein the outer bag water outlet is provided with a tap.

11. The water filtering device as claimed in claim 4, wherein the outer bag opening is forward extended by a length to have a sealing element provided thereat.

12. The water filtering device as claimed in claim 4, wherein the outer bag opening is forward extended by a length to have a hanging element provided thereat.

13. The water filtering device as claimed in claim 4, wherein the first filter unit includes multiple filtering layers.

* * * * *